(12) United States Patent
Kim et al.

(10) Patent No.: US 9,979,524 B2
(45) Date of Patent: May 22, 2018

(54) METHOD AND DEVICE FOR TRANSMITTING A TERMINAL-SPECIFIC REFERENCE SIGNAL FOR A CONTROL CHANNEL BY A BASE STATION IN A WIRELESS COMMUNICATION SYSTEM

(75) Inventors: Kitae Kim, Anyang-si (KR); Jinyoung Chun, Anyang-si (KR); Sunam Kim, Anyang-si (KR); Jiwon Kang, Anyang-si (KR); Binchul Ihm, Anyang-si (KR); Sungho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 130 days.

(21) Appl. No.: 14/353,724

(22) PCT Filed: Jun. 15, 2012

(86) PCT No.: PCT/KR2012/004731
§ 371 (c)(1),
(2), (4) Date: Apr. 23, 2014

(87) PCT Pub. No.: WO2013/062205
PCT Pub. Date: May 2, 2013

(65) Prior Publication Data
US 2015/0029963 A1    Jan. 29, 2015

Related U.S. Application Data

(60) Provisional application No. 61/551,940, filed on Oct. 27, 2011.

(51) Int. Cl.
*H04W 72/04* (2009.01)
*H04L 5/00* (2006.01)

(52) U.S. Cl.
CPC .......... *H04L 5/0051* (2013.01); *H04L 5/0053* (2013.01); *H04L 5/0023* (2013.01); *H04W 72/042* (2013.01)

(58) Field of Classification Search
CPC ... H04L 5/0051; H04L 5/0053; H04W 72/042
See application file for complete search history.

(56) References Cited

U.S. PATENT DOCUMENTS

2011/0038310 A1    2/2011  Chmiel et al.
2011/0064159 A1    3/2011  Ko et al.
(Continued)

FOREIGN PATENT DOCUMENTS

KR    10-2010-0113040 A    10/2010
KR    10-2011-0086523 A    7/2011
WO    WO 2011/052911 A2    5/2011

*Primary Examiner* — Rhonda Murphy
(74) *Attorney, Agent, or Firm* — Birch, Stewart, Kolasch & Birch, LLP (57) ABSTRACT

The present invention relates to a method for transmitting a terminal-specific reference signal for a control signal by a base station in a wireless communication system. Specifically, the method is characterized in that it comprises: transmitting a plurality of control channels and a first terminal-specific reference signal for the plurality of control channels to a first resource region; and transmitting one control channel and a second terminal-specific reference signal for the control channel to a second resource region, wherein the different descrambling identifiers are applied to the first and second terminal-specific reference signals.

10 Claims, 11 Drawing Sheets

(56) References Cited

U.S. PATENT DOCUMENTS

| | | |
|---|---|---|
| 2012/0039287 A1 | 2/2012 | Ko et al. |
| 2012/0201187 A1 | 8/2012 | Koo et al. |
| 2013/0039188 A1* | 2/2013 | Larsson ................ H04L 5/0053 370/241 |
| 2013/0064216 A1* | 3/2013 | Gao ...................... H04L 5/0016 370/330 |
| 2013/0070791 A1* | 3/2013 | Roberts ................ H04B 7/0417 370/537 |
| 2015/0139149 A1* | 5/2015 | Feng .................... H04L 5/0007 370/329 |

* cited by examiner

(a) control plane protocol stack (b) user plane protocol stack

▨ : DMRS Group 1

⊠ : DMRS Group 2

(a) RB-pair based cross interleaving   (b) RB based cross interleaving

METHOD AND DEVICE FOR TRANSMITTING A TERMINAL-SPECIFIC REFERENCE SIGNAL FOR A CONTROL CHANNEL BY A BASE STATION IN A WIRELESS COMMUNICATION SYSTEM

CROSS-REFERENCE TO RELATED APPLICATIONS

This application is the National Phase of PCT/KR2012/004731 filed on Jun. 15, 2012, which claims priority under 35 U.S.C. 119(e) to U.S. Provisional Application No. 61/551,940 filed on Oct. 27, 2011, all of which are hereby expressly incorporated by reference into the present application.

TECHNICAL FIELD

The present invention relates to a wireless communication system and, more particularly, to a method for transmitting a user equipment (UE)-specific reference signal for a control channel by a base station (BS) in a wireless communication system, and an apparatus therefor.

BACKGROUND ART

As an example of a mobile communication system to which the present invention is applicable, a 3rd generation partnership project long term evolution (hereinafter, referred to as LTE) communication system is described in brief.

Figure 1:
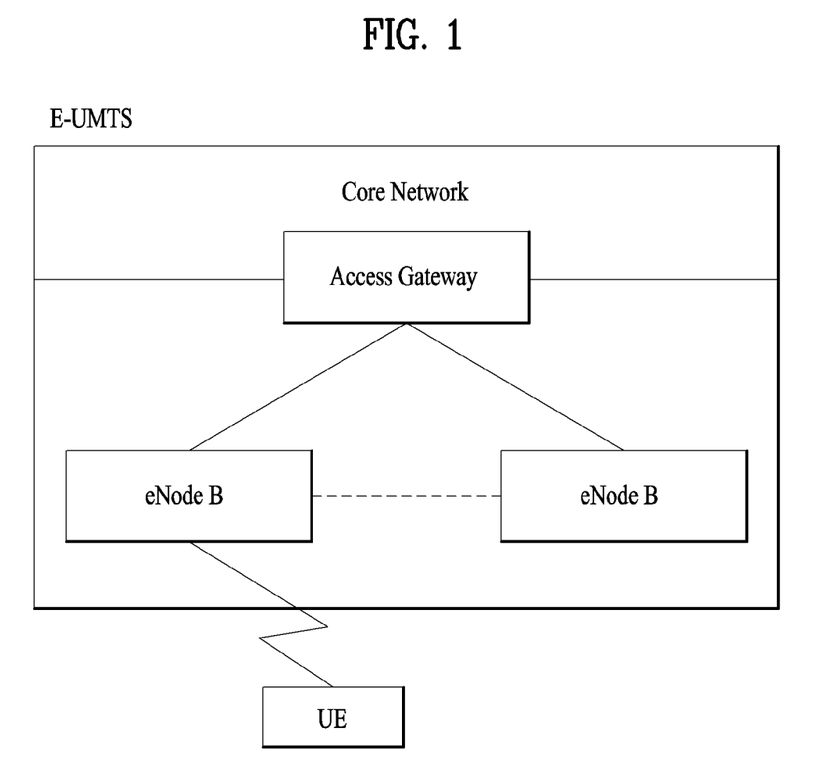
FIG. 1 is a diagram schematically illustrating a network structure of an E-UMTS as an exemplary radio communication system.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

Based on the above-described discussion, the present invention is devised to propose a method for transmitting a UE-specific reference signal for a control channel by a BS in a wireless communication system and an apparatus therefor.

Technical Solution

According to an embodiment of the present invention, provided herein is a method for transmitting a user equipment (UE)-specific reference signal for a control channel by a base station (BS) in a wireless communication system, the method including transmitting a plurality of control channels and a first UE-specific reference signal for the plural control channels to a first resource region; and transmitting one control channel and a second UE-specific reference signal for the one control channel to a first resource region, wherein different scrambling identifiers are applied to the first UE-specific reference signal and the second UE-specific reference signal.

The method may further include interleaving the plural control channels; and mapping the interleaved control channels to the first resource region.

In the method, a scrambling identifier applied to the first UE-specific reference signal may be defined as a cell-specific parameter and a scrambling identifier applied to the second UE-specific reference signal may be defined as a node-specific parameter or a UE-specific parameter.

In the method, a scrambling identifier applied to the second UE-specific reference signal may be defined as an offset value of a scrambling identifier applied to the first UE-specific reference signal.

In the method, a scrambling identifier applied to the second UE-specific reference signal may be configured through higher layer signaling separately from a scrambling identifier applied to the first UE-specific reference signal.

According to another embodiment of the present invention, provided herein is a base station (BS) in a wireless communication system, the BS including a processor for generating a plurality of control channels and a first user equipment (UE)-specific reference signal for the plural control channels and generating one control channel and a second UE-specific reference signal for the one control channel, and a radio communication module for transmitting the plural control channels and the first UE-specific reference signal to a first region and transmitting the one control channel and the second UE-specific reference signal to a second region, wherein the processor applies different scrambling identifiers upon generating the first UE-specific reference signal and the second UE-specific reference signal.

The processor may interleave the plural control channels and map the interleaved control channels to the first resource region.

In the BS, a scrambling identifier applied to the first UE-specific reference signal may be defined as a cell-specific parameter and a scrambling identifier applied to the second UE-specific reference signal may be defined as a node-specific parameter or a UE-specific parameter.

In the BS, a scrambling identifier applied to the second UE-specific reference signal may be defined as an offset value of a scrambling identifier applied to the first UE-specific reference signal.

In the BS, a scrambling identifier applied to the second UE-specific reference signal may be configured through higher layer signaling separately from a scrambling identifier applied to the first UE-specific reference signal.

Advantageous Effects

According to the embodiments of the present invention, a BS can efficiently generate and transmit a UE-specific reference signal for a control signal, when the control channel is transmitted in a legacy data region in a wireless communication system.

Effects according to the present invention are not limited to what has been particularly described hereinabove and other advantages not described herein will be more clearly understood by persons skilled in the art from the following detailed description of the present invention.

BEST MODE FOR CARRYING OUT THE INVENTION

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

Figure 2:
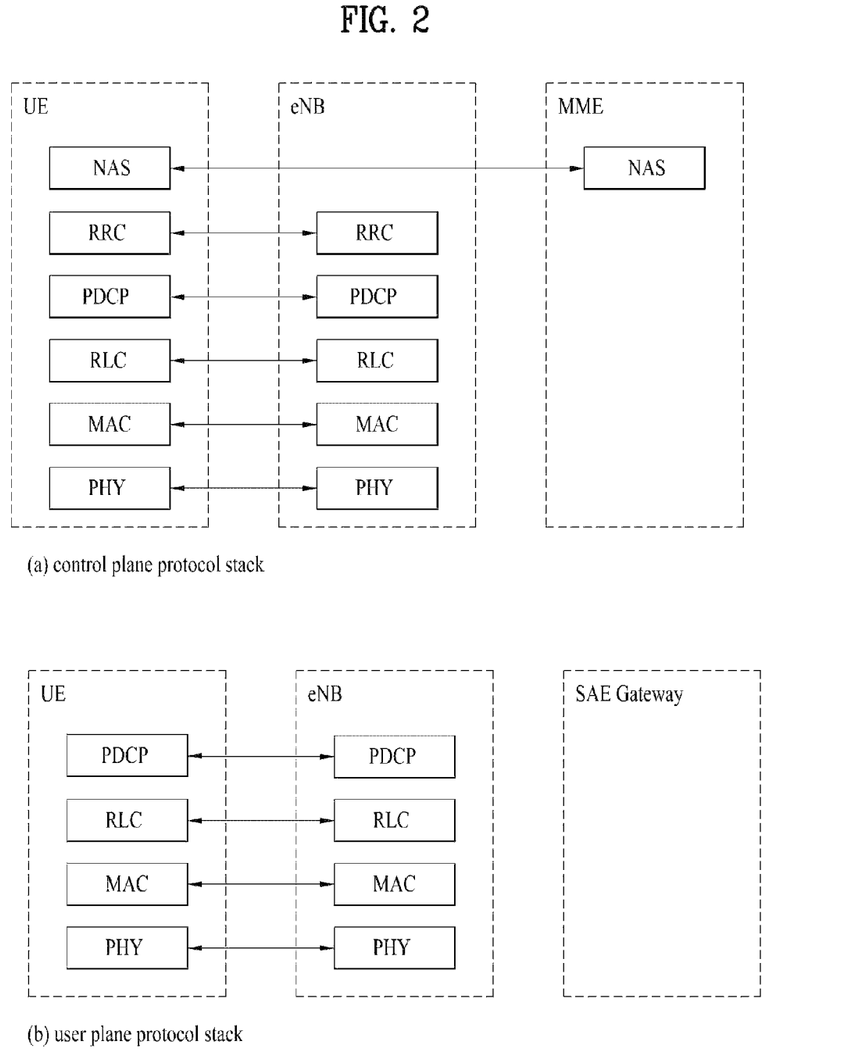
FIG. 2 is a diagram illustrating structures of a control plane and a user plane of a radio interface protocol between a UE and an E-UTRAN based on the 3GPP radio access network specification.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel (an antenna port channel). Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting an eNB is configured to use one of bandwidths of 1.4, 3, 5, 10, and 20 MHz to provide a DL or UL transmission service to a plurality of UEs. Different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
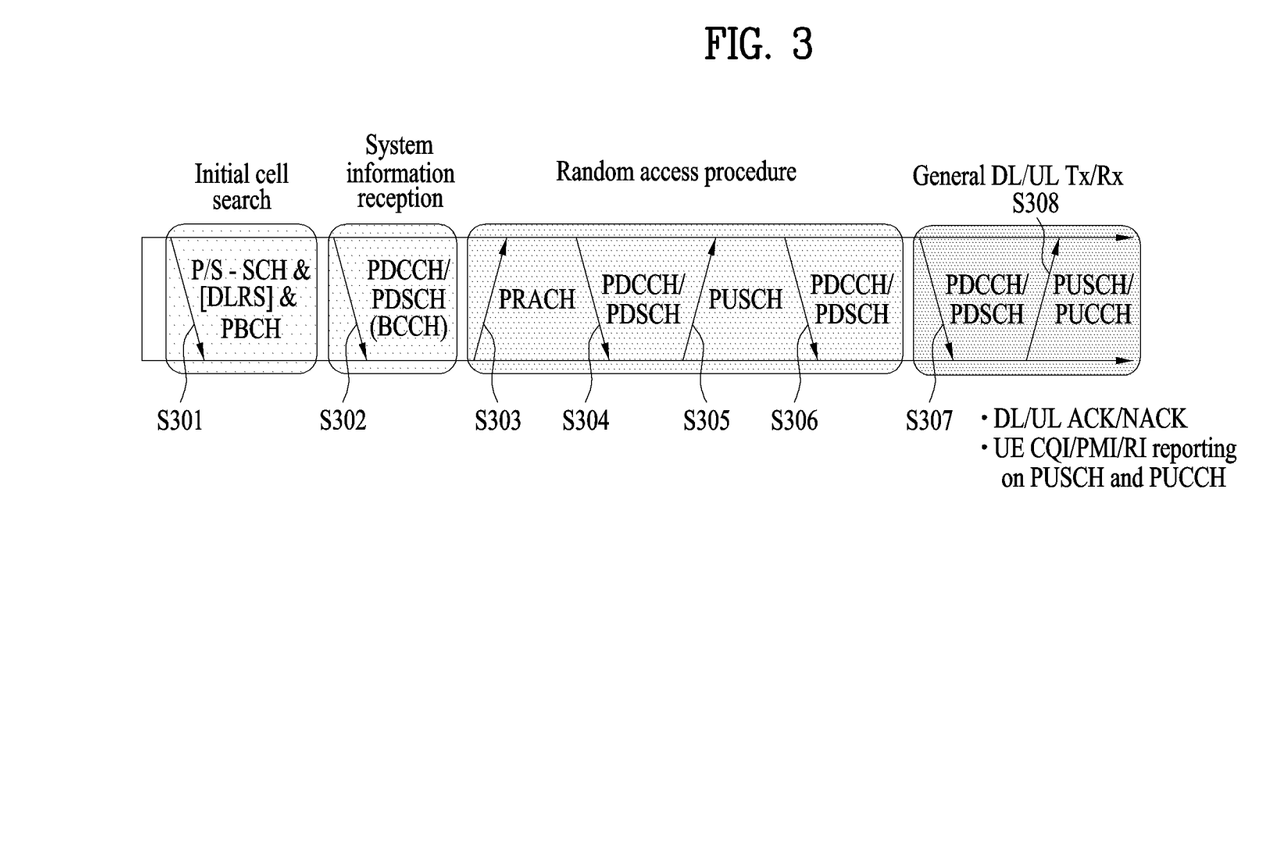
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
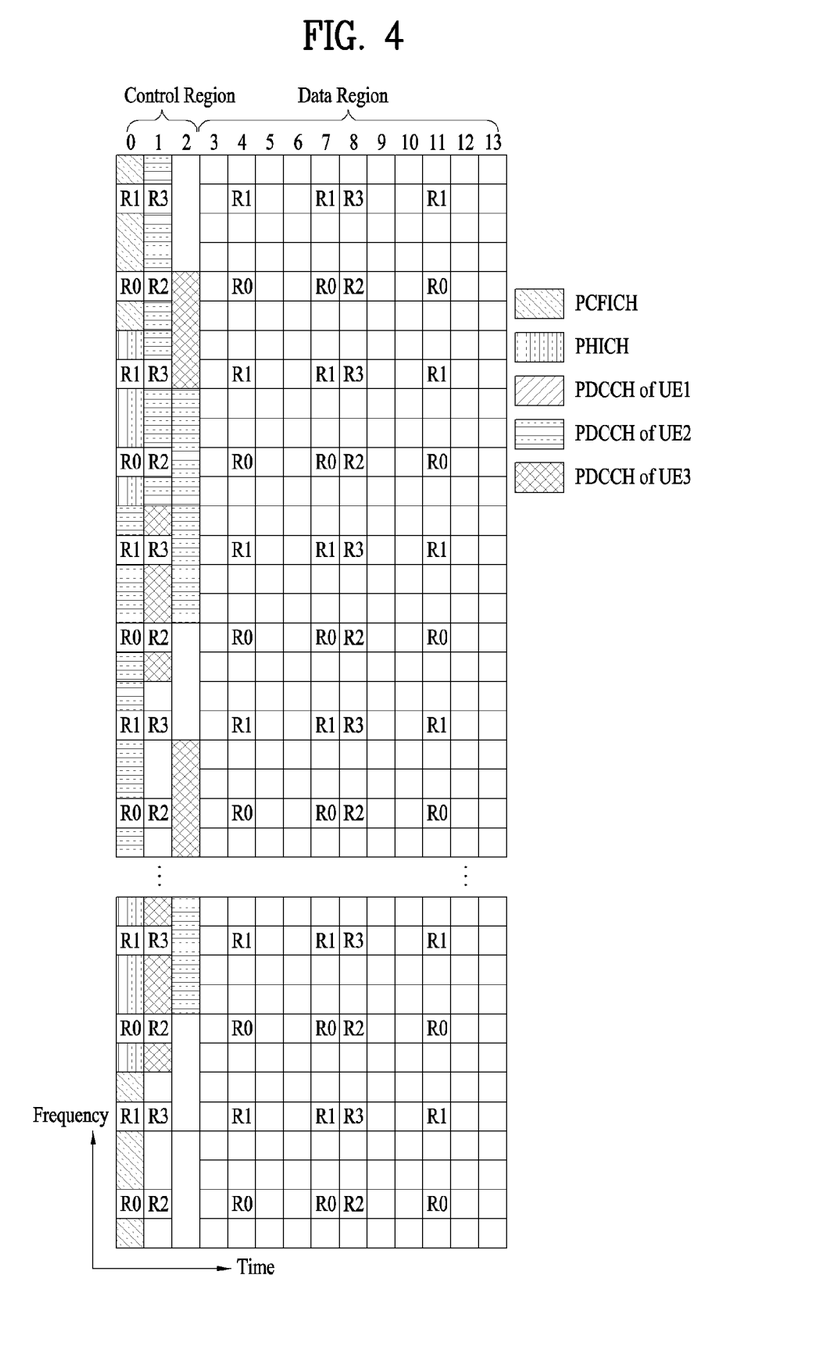
FIG. 4 is a diagram illustrating the structure of a DL radio frame used in an LTE system.

FIG. 4 is a diagram illustrating control channels contained in a control region of one subframe in a DL radio frame.

Figure 5:
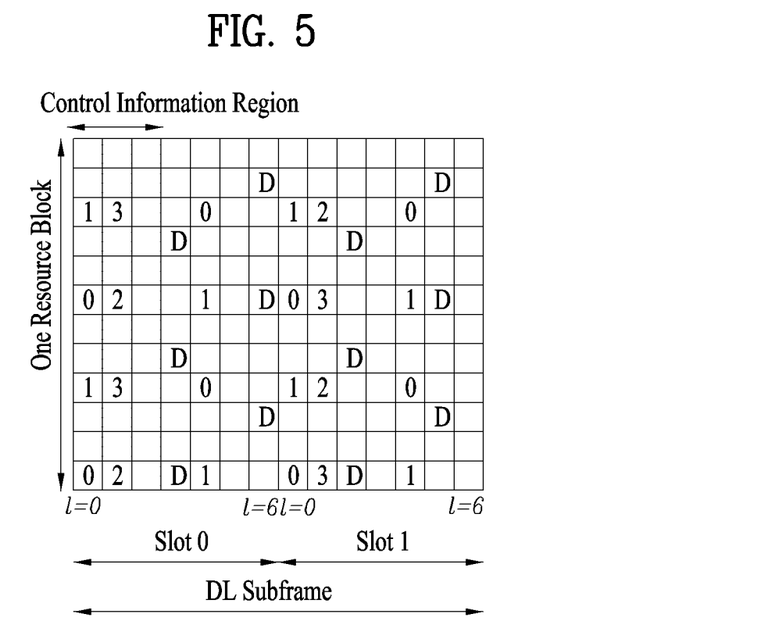
FIGS. 5 and 6 are diagrams illustrating the structure of RSs in an LTE system supporting DL transmission using four antennas.

Referring to FIG. 4, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using transport format information 'C' (e.g. a transport block size, a modulation scheme, coding information, etc.) is transmitted in a specific subframe, a UE located in a cell monitors the PDCCH using RNTI information thereof. If one or more UEs having RNTI 'A' are present, the UEs receive the PDCCH and receive a PDSCH indicated by 'B' and 'C' based on the received information of the PDCCH.

Meanwhile, a basic resource unit of a DL control channel is an REG. The REG includes four contiguous REs except for REs carrying RSs. A PCFICH and a PHICH include 4 REGs and 3 REGs, respectively. A PDCCH is configured in units of a control channel element (CCE), each CCE including 9 REGs.

To determine whether a PDCCH including L CCEs is transmitted to a UE, the UE is configured to monitor $M^{(L)}$ ($\geq L$) CCEs that are arranged contiguously or in a specific rule. L that the UE should consider for PDCCH reception may be a plural value. CCE sets that the UE should monitor to receive a PDCCH are referred to as a search space. For example, an LTE system defines search spaces as illustrated in [Table 1].

TABLE 1

| Type | Search space $S_k^{(L)}$ | | Number of PDCCH candidates $M^{(L)}$ | DCI formats |
|---|---|---|---|---|
| | Aggregation level L | Size [in CCEs] | | |
| UE-specific | 1 | 6 | 6 | 0, 1, 1A, 2B, |
| | 2 | 12 | 6 | 1D, 2, 2A, 2B, 4 |
| | 4 | 8 | 2 | |
| | 8 | 16 | 2 | |
| Common | 4 | 16 | 4 | 0, 1A, 1C, 3/3A |
| | 8 | 16 | 2 | |

In [Table 1], L is a CCE aggregation level, that is, the number of CCEs in a PDCCH, $S_k^{(L)}$ is a search space with CCE aggregation level L, and $M^{(L)}$ is the number of candidate PDCCHs to be monitored in the search space with CCE aggregation level L.

Search spaces may be classified into a UE-specific search space accessible only to a specific UE and a common search space accessible to all UEs within a cell. A UE monitors common search spaces with CCE aggregation levels 4 and 8 and UE-specific search spaces with CCE aggregation levels 1, 2, 4, and 8. A common search space and a UE-specific search space may overlap with each other.

For each CCE aggregation level, the position of the first CCE (a CCE having the smallest index) of a PDCCH search space allocated to an arbitrary UE changes in every subframe according to a UE. This is called PDCCH search space hashing.

A CCE may be distributed across a system band. More specifically, a plurality of logically contiguous CCEs may be input to an interleaver and the interleaver may permute the input CCEs on an REG basis. Accordingly, the time/frequency resources of one CCE are distributed physically across the total time/frequency area of the control region of a subframe. Consequently, since a control channel is configured in units of a CCE but interleaved in units of an REG, a frequency diversity gain and an interference randomization gain can be maximized.

Hereinafter, an RS will be described in more detail.

Generally, for channel measurement, an RS known to both a transmitting side and a receiving side is transmitted together with data from the transmitting side to the receiving side. Such an RS serves to perform a demodulation process as well as channel measurement by indicating a modulation scheme. The RS is classified into a dedicated RS (DRS) for a BS and a specific UE, i.e. a UE-specific RS, and a cell-specific RS for all UEs in a cell, i.e. a common RS (CRS). The CRS includes an RS used by a UE to measure CQI/PMI/RI and report the measured result to a BS and this RS is referred to as a channel state information-RS (CSI-RS).

Figure 6:
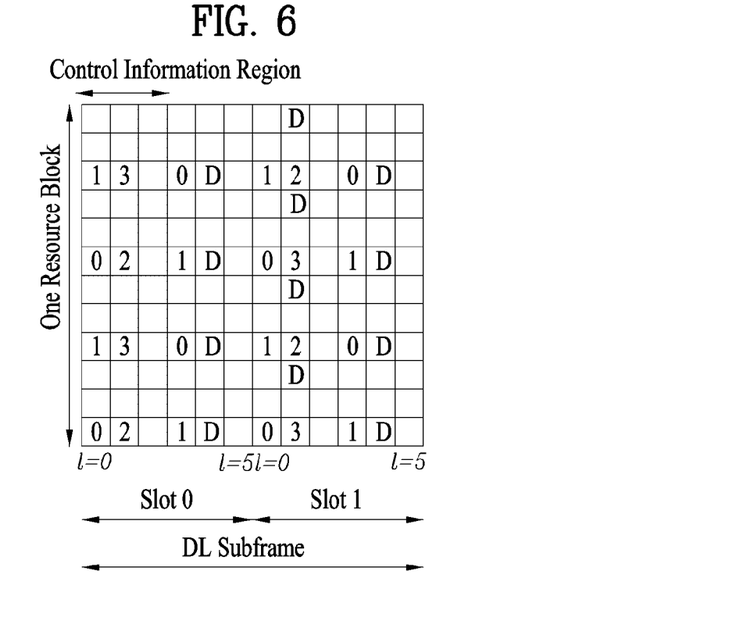

FIGS. 5 and 6 are diagrams illustrating the structure of RSs in an LTE system supporting DL transmission using four antennas. Specifically, FIG. 5 illustrates the structure of the RS in a normal CP and FIG. 6 illustrates the structure of the RS in an extended CP.

Referring to FIGS. 5 and 6, numbers 0 to 3 denoted in lattices indicate CRSs, i.e. cell-specific RSs, transmitted for channel measurement and data demodulation in correspondence to antenna ports 0 to 3, respectively. The CRSs may be transmitted to the UE in all control information regions as well as in data information regions.

In addition, 'D's denoted in lattices indicate downlink demodulation-RSs (DM-RSs) which are UE-specific RSs. The DM-RSs support transmission of a single antenna port through a data region, i.e. through a PDSCH. Whether or not the DM-RS, which is a UE-specific RS, is present is signaled to the UE through higher layers. In FIGS. 5 and 6, DM-RSs corresponding to an antenna port 5 are illustrated. In the 3GPP standard document 36.211, DM-RSs for a total of 8 antenna ports, from an antenna port 7 to an antenna port 14, are defined.

Figure 7:
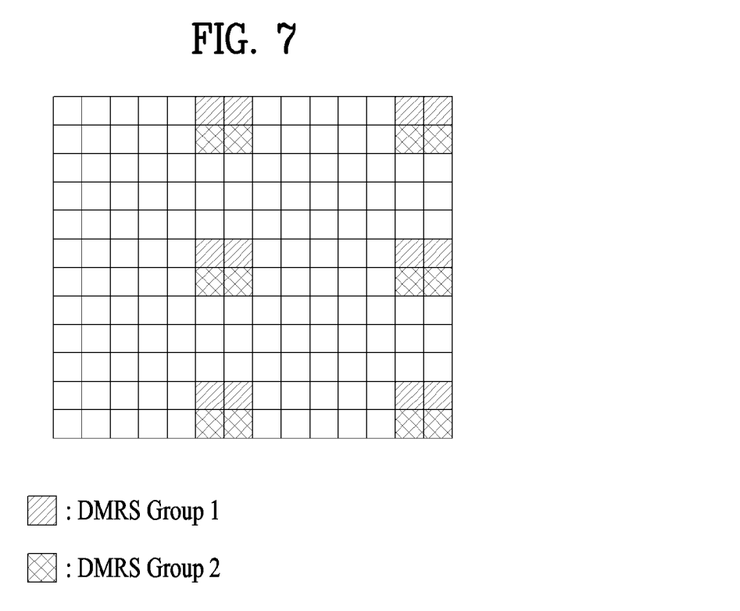
FIG. 7 illustrates an example of DL DM-RS allocation defined in the current 3GPP standard document.

FIG. 7 illustrates an example of DL DM-RS allocation defined in the current 3GPP standard document.

Referring to FIG. 7, DM-RSs corresponding to antenna ports {7, 8, 11, 13} are mapped using a sequence per antenna port in DM-RS group 1. DM-RSs corresponding to antenna ports {9, 10, 12, 14} are also mapped using a sequence per antenna port in DM-RS group 2.

The following Equation 1 is an equation for generating a DM-RS sequence in an LTE system.

$$r_{n_s}(m) = \frac{1}{\sqrt{2}}(1 - 2 \cdot c(2m)) + j\frac{1}{\sqrt{2}}(1 - 2 \cdot c(2m + 1)) \quad \text{[Equation 1]}$$

In Equation 1, c(n) is a pseudo-random sequence and is defined using a length-31 Gold sequence as indicated by Equation 2.

$c(n)=(x_1(n+N_C)+x_2(n+N_C))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ [Equation 2]

In Equation 2, $N_C$ is 1600 and a first m-sequence is initialized with $x_1(0)=1$ and $x_1(n)=0$ (where n=1 to 30). An initial value of a second m-sequence is defined as $c_{init}=\sum_{i=0}^{30}x_2(i)\cdot 2^i$ and is determined according to usage of the sequence. In a DM-RS sequence, $c_{init}$ is defined as indicated by Equation 3.

$$c_{init}=(\lfloor n_s/2 \rfloor+1)\cdot(2N_{ID}^{cell}+1)\cdot 2^{16}+n_{RNTI} \quad \text{[Equation 3]}$$

Referring to Equation 3, during DM-RS assignment, a DM-RS is multiplexed using an orthogonal code in the time domain and $n_{RNTI}$ is set to 0 or 1 to perform quasi-orthogonal DM-RS assignment. That is, since $n_{RNTI}$ is set to $n_{RNTI}=\{0, 1\}$, a quasi-orthogonal pseudo-random sequence is generated. In addition, $N_{ID}^{cell}$ refers to a cell identity, especially, a physical cell identity (PCI).

Meanwhile, the above-described CSI-RS has been proposed for the purpose of channel measurement of a PDSCH, separately from a CRS. Unlike the CRS, the CSI-RS may be defined as a maximum of 32 different CSI-RS configurations to reduce inter-cell interference (ICI) in a multi-cell environment.

Figure 8:
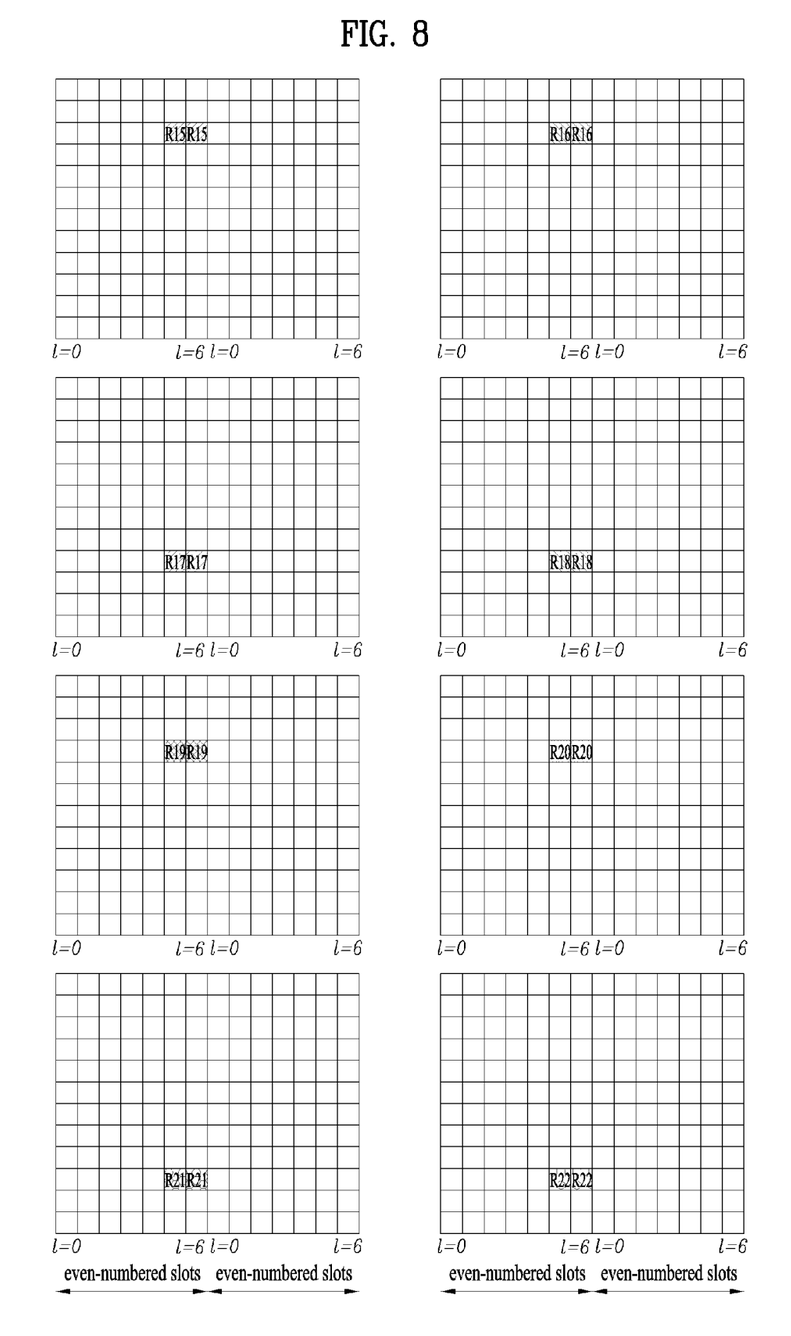
FIG. 8 illustrates CSI-RS configuration #0 in the case of a normal CP among CSI-RS configurations defined in the current 3GPP standard document.

A CSI-RS configuration varies according to the number of antenna ports. Contiguous cells are configured to transmit CSI-RSs configured as differently as possible. The CSI-RS supports a maximum of 8 antennas unlike the CRS. In the 3GPP standard document, up to 8 antennas, from antenna port 15 to antenna port 22, are allocated as antenna ports for the CSI-RS. FIG. 8 illustrates CSI-RS configuration #0 in the case of a normal CP among CSI-RS configurations defined in the current 3GPP standard document.

With the emergence and widespread use of various devices requiring machine-to-machine (M2M) communication and a large amount of data, the amount of required data over a cellular network has rapidly increased in a current radio communication environment. To satisfy requirements for the large amount of data, communication technology has developed into carrier aggregation technology that enables efficient use of more frequency bands, MIMO that increases data capacity in a limited frequency, coordinated multi-point (CoMP), etc. In addition, communication environments are evolving toward increasing the density of accessible nodes in the vicinity of a user. A system equipped with nodes with high density may exhibit higher system performance by cooperation between nodes. Such a scheme provides much better performance than a non-cooperative case in which each node serves as an independent base station (BS), advanced BS (ABS), node-B (NB), eNode-B (eNB), or access point (AP).

Figure 9:
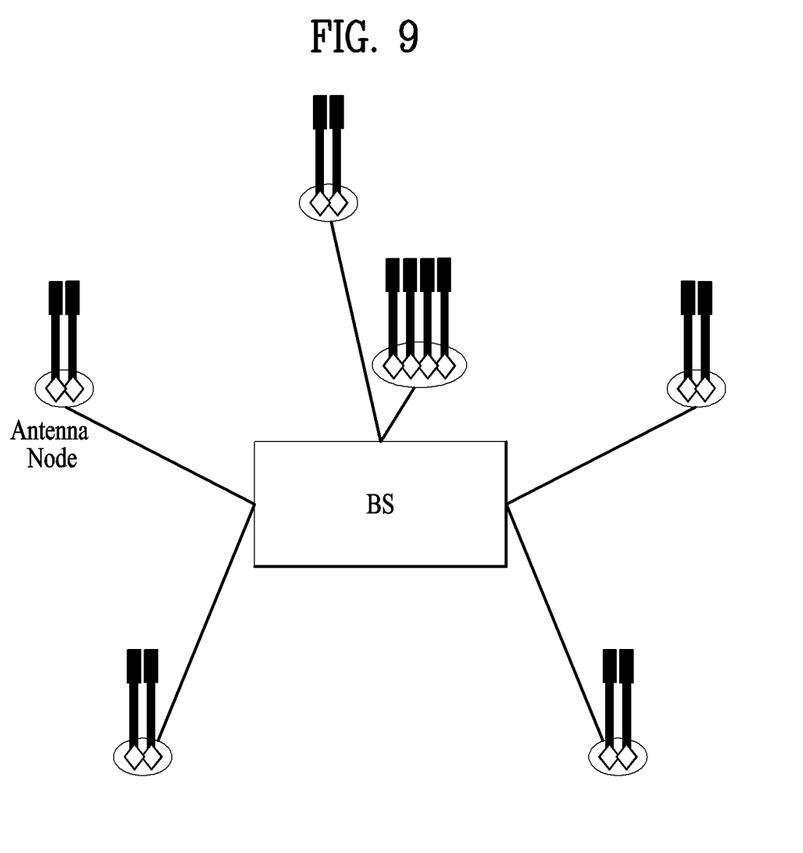
FIG. 9 is a diagram illustrating a multi-node system in a next-generation communication system.

FIG. 9 is a diagram illustrating a multi-node system in a next-generation communication system.

Referring to FIG. 9, if transmission and reception of all nodes is managed by one controller so that individual nodes operate as a partial antenna set of one cell, this system may be regarded as a distributed multi-node system (DMNS) forming one cell. In this case, the individual nodes may be assigned additional node IDs or may operate as partial antennas in a cell without the node IDs. However, if the nodes have different cell IDs, this system may be regarded as a multi-cell system. If multiple cells are overlaid according to their coverage, this is referred to as a multi-tier network.

Meanwhile, a node may be any of a Node B, an eNB, a picocell eNB (PeNB), a home eNB (HeNB), a remote radio head (RRH), a relay, a distributed antenna, etc. At least one antenna is installed in one node. A node is also called a transmission point. While a node refers to an antenna group with antennas apart from each other by a predetermined distance or farther, the present invention may be implemented even though a node is defined as an antenna group irrespective of the distance between antennas.

Owing to the introduction of the multi-node system, various communication techniques have become available, thereby improving channel quality. However, to apply MIMO and inter-cell cooperative communication technology to a multi-node environment, a new control channel is required. In this context, enhanced PDCCH (E-PDCCH) is under discussion and it is regulated that the E-PDCCH is allocated to a data region (hereinafter, referred to as a PDSCH region) other than a legacy control region (hereinafter, referred to as a PDCCH region). Since the E-PDCCH enables transmission of control information about a node to each UE, shortage of the legacy PDCCH region may be overcome. For reference, the E-PDCCH is not provided to legacy UEs and only LTE-A UEs can receive the E-PDCCH.

Figure 10:
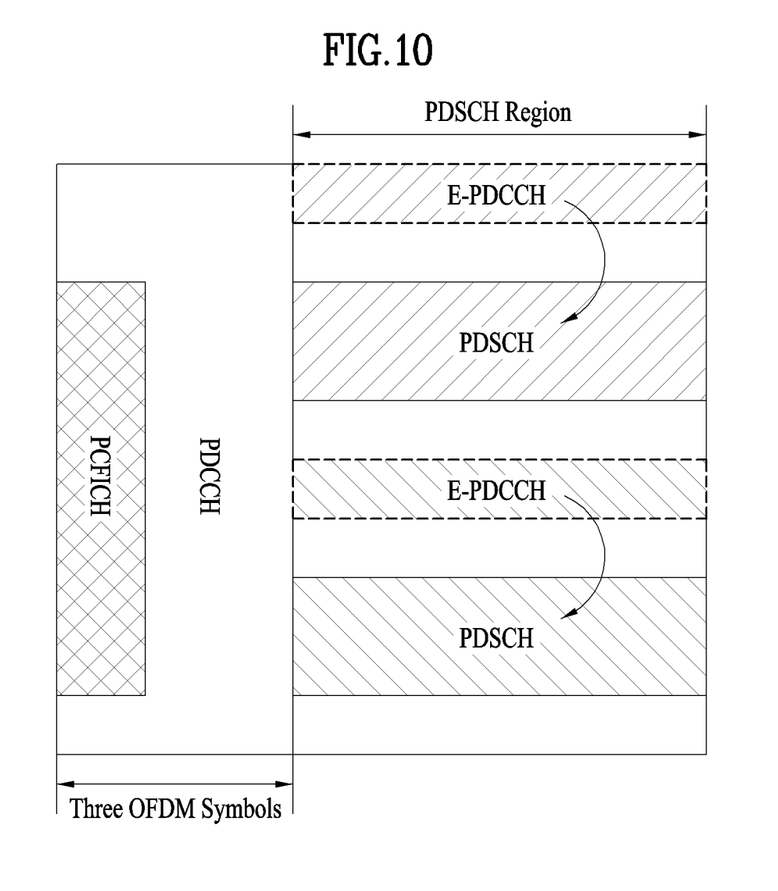
FIG. 10 is a diagram illustrating an example of an E-PDCCH and a PDSCH scheduled by the E-PDCCH.

FIG. 10 is a diagram illustrating an example of an E-PDCCH and a PDSCH scheduled by the E-PDCCH.

Referring to FIG. 10, an E-PDCCH may be used by defining a portion of a PDSCH region in which data is generally transmitted. A UE should perform blind decoding to determine the presence or absence of an E-PDCCH directed thereto. The E-PDCCH functions to schedule (i.e. PDSCH and PDSCH control) like a legacy PDCCH. However, if more UEs are connected to a node such as an RRH and thus more E-PDCCHs are allocated to the PDSCH region, the UE should perform more blind decoding procedures, thus experiencing increased complexity.

Meanwhile, a method for multiplexing E-PDCCHs for a plurality of UEs also needs to be considered. Specifically, under the state in which a common resource region, that is, a common PRB set, is configured, a technique multiplexed with the format of cross-interleaving E-PDCCHs of multiple UEs in the frequency domain or time domain has been proposed.

Figure 11:
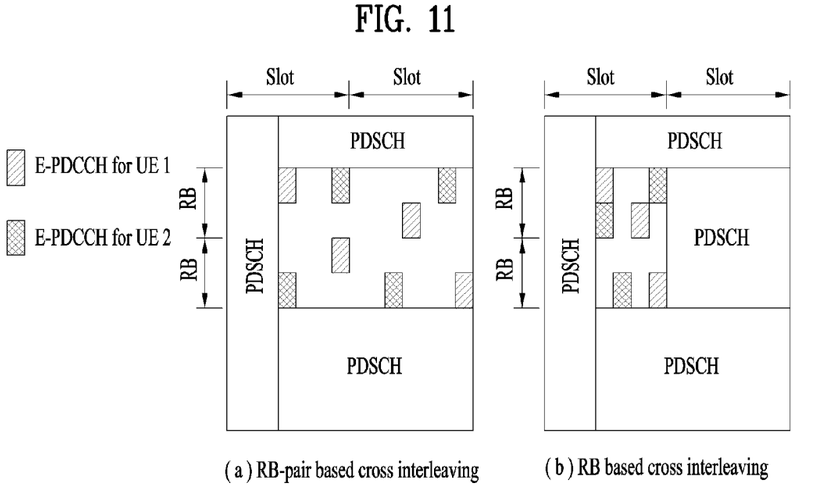
FIG. 11 is a diagram illustrating a method for multiplexing E-PDCCHs for a plurality of UEs.

FIG. 11 is a diagram illustrating a method for multiplexing E-PDCCHs for a plurality of UEs.

Particularly, FIG. 11(*a*) illustrates an example in which a common PRB set is configured in units of a PRB pair and cross interleaving is performed on a PRB pair basis. On the other hand. FIG. 11(*b*) illustrates an example in which a common PRB set is configured only in units of a PRB and cross interleaving is performed on a PRB basis. This scheme has an advantage of obtaining diversity gain in terms of the frequency/time domain throughout a plurality of RBs.

Meanwhile, an E-PDCCH resource region may be classified into an interleaving resource region in which cross interleaving is applied and a non-interleaving resource region in which cross interleaving is not applied. Alternatively, the E-PDCCH region may be divided into a resource region for a common search space and a resource region for a UE-specific search space. Further, the E-PDCCH resource region may be divided into a resource region for a first RNTI set and a resource region for a second RNTI, among a plurality of RNTIs.

Figure 12:
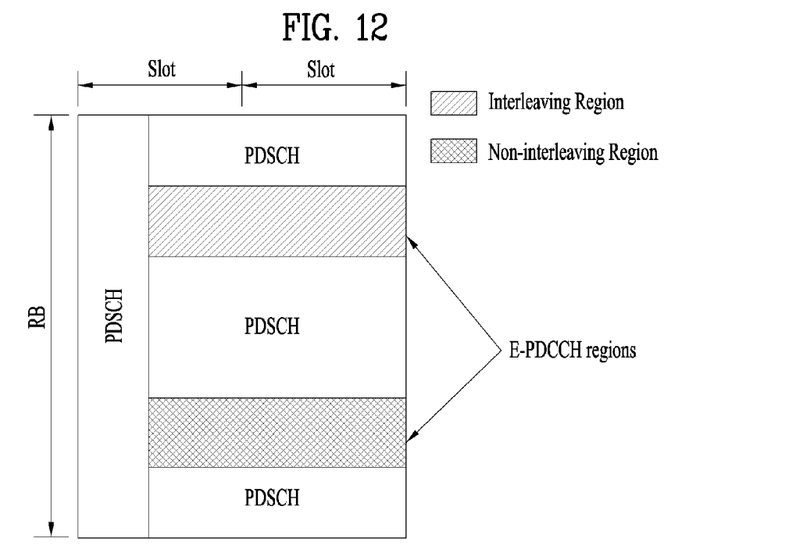
FIG. 12 is a diagram illustrating an example of configuring E-PDCCHs by dividing E-PDCCH resource regions into an interleaving resource region and a non-interleaving resource region.

FIG. 12 illustrates an example of configuring E-PDCCHs by dividing E-PDCCH resource regions into an interleaving resource region and a non-interleaving resource region. To decode the E-PDCCH, DM-RS port assignment suitable for each region needs to be performed and a DM-RS sequence also needs to be correspondingly configured. A PCI is used to configure the DM-RS sequence. For multiplexing of E-PDCCHs, a CSI-RS configuration may be additionally used instead of the PCI or use of a variable PCI configuration through UE-specific signaling may be additionally considered.

The present invention proposes a method of generating a DM-RS sequence for E-PDCCH decoding and a method for assigning the sequence. In the present invention, for convenience of description, an E-PDCCH assignment region is divided into a region to which cross interleaving is applied and a region to which cross interleaving is not applied, defined as a first region and a second region, respectively and a proper DM-RS sequence generation and assignment method for a corresponding region will be described below.

First, it is assumed that E-PDCCH regions can be configured by a first region and a second region as illustrated in FIG. 12. In this case, the present invention proposes that different DM-RS sequences be allocated to the first region and the second region for E-PDCCH decoding. That is, when the same UE detects an E-PDCCH in each of the first region and the second region, a different DM-RS sequence per region may be used.

In generating the DM-RS sequence of the above-described Equation 1, $C_{init}$ is determined by Equation 3. Referring to Equation 3, $N_{ID}^{cell}$ (PCI) and $n_{SCID}$ (or $n_{RNTI}$) are used. Here, since $N_{ID}^{cell}$ cannot be configured per UE, $n_{SCID}$ should be changed in order to generate a different DM-RS sequence per region.

Hence, when one UE detects E-PDCCHs, $N_{ID}^{cell}=0$ and $n_{SCID}=0$ may be used in the first region and $N_{ID}^{cell}=0$ and $n_{SCID}=0$ may be used in the second region to generate different DM-RS sequences according to the present invention. Hereinafter, $n_{SCID}$ will be referred to as an ID for generating a DM-RS sequence.

1) Accordingly, a UE may implicitly configure an ID for generating a DM-RS sequence upon generating the DM-RS sequence for E-PDCCH detection of the second region. As the ID for generating the DM-RS sequence, an RNTI of the UE may be basically used and the UE may generate different DM-RS sequences with respect to the regions by differently configuring an ID value per E-PDCCH region.

For example, if the UE has generated a DM-RS sequence in the first region by configuring a UE-specific RNTI or C-RNTI as $ID_{R1}$, the UE may implicitly configure $ID_{R2}$ in the second region using CSI-RS configuration information that is not dependent on a cell ID. That is, if $ID_{R1}$ used to generate a DM-RS sequence of the first region is 'n', $ID_{R2}$ may be set to 'm' (where n≠m) using the CSI-RS configuration information in the second region Alternatively, $ID_{R2}$ may be configured in an offset form of '$ID_{R2}=n+m$' and, to derive $ID_{R2}$, not only the CSI-RS configuration information but also a virtual cell ID, a node ID, and an antenna port number for a DM-RS sequence may be used.

2) In addition, when defining an ID for generating a DM-RS sequence different from an ID of the first region in order to detect an E-PDCCH of the second region, a BS may signal corresponding information to a UE. That is, this means that the BS may transmit $ID_{R2}$ configured for the second region to the UE through RRC signaling. In this case, $ID_{R2}$ for the second region may be configured according to the above method of 1) or may be randomly selected by the BS.

3) Finally, when generating a DM-RS sequence for E-PDCCH detection, a method for using cell-specific parameters in the first region and using node-specific or UE-specific parameters in the second region may be considered. Here, the parameters may be separately signaled or information pre-shared by the BS and the UE may be used as the parameters.

For example, when generating a DM-RS sequence of the first region, $N_{ID}^{cell}$ and $n_{SCID}$ are used as in a conventional scheme and when generating a DM-RS sequence of the second region, CSI-RS related parameters (e.g. CSI-RS configuration information, a CSI-RS pattern, or a subframe index) may be used instead of $N_{ID}^{cell}$ and/or $n_{SCID}$ Alternatively, a cell combination value of $N_{ID}^{cell}N_{ID}^{cell}$, $n_{SCID}$ and/or CSI-RS related parameters may be used.

Figure 13:
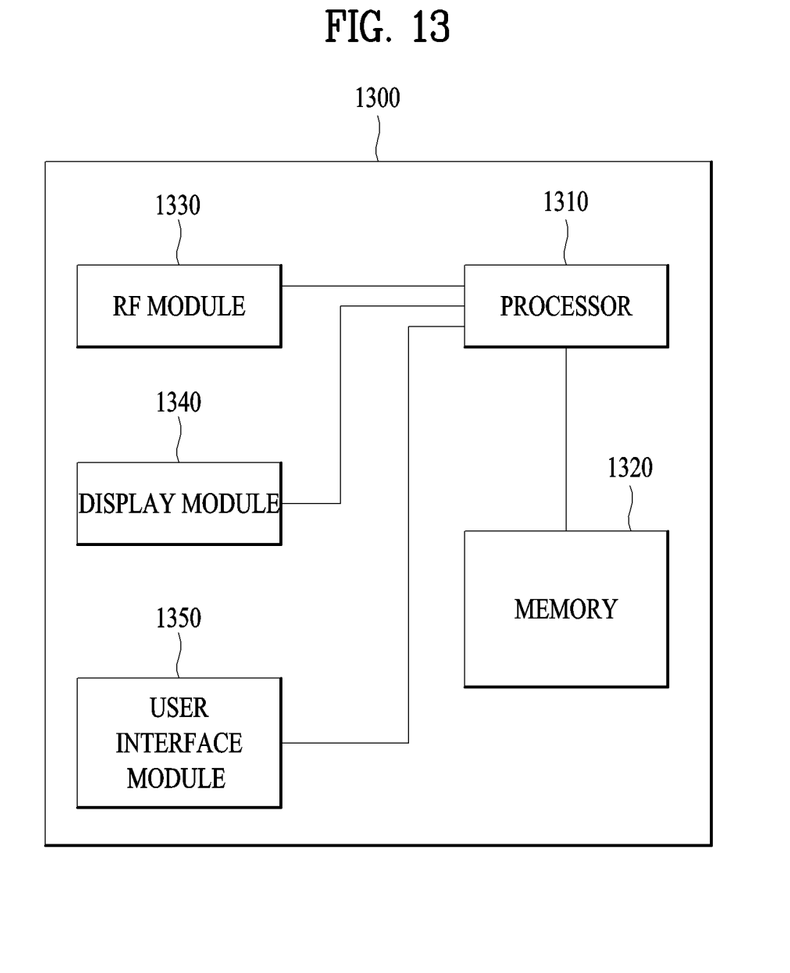
FIG. 13 is a block diagram of a communication apparatus according to an embodiment of the present invention.

Referring to FIG. 13, a communication device 1300 includes a processor 1310, a memory 1320, a radio frequency (RF) module 1330, a display module 1340, and a user interface module 1350.

The communication device 1300 is illustrated for convenience of description and some modules may be omitted. The communication device 1300 may further include necessary modules. Some modules of the communication device 1300 may be further divided into sub-modules. The processor 1300 is configured to perform operations according to the embodiments of the present invention exemplarily described with reference to the drawings. Specifically, for a detailed description of operations of the processor 2100, reference may be made to the statements described with reference to FIGS. 1 to 12.

The memory 1320 is connected to the processor 1310 and stores operating systems, applications, program code, data, and the like. The RF module 1330 is connected to the processor 1310 and performs a function of converting a baseband signal into a radio signal or converting a radio signal into a baseband signal. For this, the RF module 1330 performs analog conversion, amplification, filtering, and frequency upconversion or performs inverse processes thereof. The display module 1340 is connected to the processor 1310 and displays various types of information. The display module 1340 may include, but is not limited to, a well-known element such as a liquid crystal display (LCD), a light emitting diode (LED), or an organic light emitting diode (OLED). The user interface module 1350 is connected to the processor 1310 and may include a combination of well-known user interfaces such as a keypad and a touchscreen.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent on each other may of course be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While the method and apparatus in which a BS transmits a UE-specific RS for a control channel in a wireless communication system have been described in the context of a 3GPP LTE system, the present invention is also applicable to many other wireless communication systems in addition to the 3GPP LTE system.

The invention claimed is:

1. A method for transmitting a user equipment (UE)-specific reference signal for a control channel by a base station (BS) in a wireless communication system, the method comprising:
    transmitting a first control channel and a first UE-specific reference signal for the first control channel to a first resource region included in an enhanced-physical downlink control channel (E-PDCCH) resource region; and
    transmitting a second control channel and a second UE-specific reference signal for the second control channel to a second resource region included in the E-PDCCH resource region,
    wherein the E-PDCCH resource region is divided into the first resource region and the second resource region on a frequency axis based on whether interleaving is applied to the first control channel included in the first resource region and the second control channel included in the second resource region, and
    wherein different scrambling identifiers are applied, by the same BS, to generate a sequence for the first UE-specific reference signal and a sequence for the second UE-specific reference signal for the first resource region and the second resource region.

2. The method according to claim 1, further comprising:
    interleaving the first control channel; and
    mapping the interleaved control channel to the first resource region.

3. The method according to claim 1, wherein a scrambling identifier applied to the first UE-specific reference signal is defined as a cell-specific parameter and a scrambling identifier applied to the second UE-specific reference signal is defined as a node-specific parameter or a UE-specific parameter.

4. The method according to claim 1, wherein a scrambling identifier applied to the second UE-specific reference signal is defined as an offset value of a scrambling identifier applied to the first UE-specific reference signal.

5. The method according to claim 1, wherein a scrambling identifier applied to the second UE-specific reference signal is configured through higher layer signaling separately from a scrambling identifier applied to the first UE-specific reference signal.

6. A base station in a wireless communication system, the base station comprising:
    a processor configured to:
        generate a first control channel and a first user equipment (UE)-specific reference signal for the first control channel, and
        generate a second control channel and a second UE-specific reference signal for the second control channel; and
    a transmitter configured to:
        transmit the first control channel and the first UE-specific reference signal to a first region included in an enhanced-physical downlink control channel (E-PDCCH) resource region, and
        transmit the second control channel and the second UE-specific reference signal to a second region included in the E-PDCCH resource region,
    wherein the E-PDCCH resource region is divided into the first resource region and the second resource region on a frequency axis based on whether interleaving is applied to the first control channel included in the first resource region and the second control channel included in the second resource region, and
    wherein the processor applies different scrambling identifiers upon generating a sequence for the first UE-specific reference signal and a sequence for the second UE-specific reference signal for the first resource region and the second resource region.

7. The base station according to claim 6, wherein the processor interleaves the first control channel and maps the interleaved control channel to the first resource region.

8. The base station according to claim 6, wherein a scrambling identifier applied to the first UE-specific reference signal is defined as a cell-specific parameter and a scrambling identifier applied to the second UE-specific reference signal is defined as a node-specific parameter or a UE-specific parameter.

9. The base station according to claim 6, wherein a scrambling identifier applied to the second UE-specific reference signal is defined as an offset value of a scrambling identifier applied to the first UE-specific reference signal.

10. The base station according to claim 6, wherein a scrambling identifier applied to the second UE-specific reference signal is configured through higher layer signaling separately from a scrambling identifier applied to the first UE-specific reference signal.

* * * * *